(12) United States Patent
Rosenberger et al.

(10) Patent No.: US 7,824,110 B2
(45) Date of Patent: Nov. 2, 2010

(54) DATA TRANSMISSION CABLE WITH FAKRA HOUSING

(75) Inventors: Bernd Rosenberger, Tittmoning (DE); Clemens Wurster, Augsburg (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 247 days.

(21) Appl. No.: 11/909,238

(22) PCT Filed: Mar. 28, 2006

(86) PCT No.: PCT/EP2006/002811

§ 371 (c)(1),
(2), (4) Date: Sep. 20, 2007

(87) PCT Pub. No.: WO2006/105896

PCT Pub. Date: Oct. 12, 2006

(65) Prior Publication Data

US 2009/0263086 A1 Oct. 22, 2009

(30) Foreign Application Priority Data

Apr. 5, 2005 (DE) .................. 20 2005 005 362 U

(51) Int. Cl.
*G02B 6/38* (2006.01)
*G02B 6/36* (2006.01)

(52) U.S. Cl. .............. 385/74; 385/53; 385/54; 385/55; 385/56; 385/57; 385/58; 385/59; 385/60; 385/61; 385/62; 385/63; 385/64; 385/65; 385/66; 385/67; 385/68; 385/69; 385/70; 385/71; 385/72; 385/73; 385/75; 385/76; 385/77; 385/78; 385/79; 385/80; 385/81; 385/82; 385/83; 385/84; 385/85; 385/86; 385/87; 385/88; 385/89; 385/90; 385/91; 385/92; 385/93; 385/94

(58) Field of Classification Search .............. 385/53–94
See application file for complete search history.

(56) References Cited

U.S. PATENT DOCUMENTS

| 3,569,933 | A | * | 3/1971 | Longenecker et al. ....... 340/458 |
| 4,691,985 | A | | 9/1987 | Shank et al. |
| 4,707,063 | A | | 11/1987 | Plummer et al. |
| 4,733,936 | A | | 3/1988 | Mikollaicyk et al. |
| 6,035,084 | A | * | 3/2000 | Haake et al. ................... 385/49 |
| 6,210,046 | B1 | * | 4/2001 | Rogers et al. ................. 385/74 |
| 2003/0176104 | A1 | | 9/2003 | Hall et al. |

FOREIGN PATENT DOCUMENTS

| DE | 42 21 040 A1 | 1/1994 |
| EP | 0 053 914 A | 6/1982 |
| JP | 61 169804 A | 12/1986 |

* cited by examiner

*Primary Examiner*—Brian M. Healy
*Assistant Examiner*—Guy G Anderson
(74) *Attorney, Agent, or Firm*—DeLio & Peterson, LLC; Robert Curcio

(57) ABSTRACT

The invention relates to a data transmission cable (10; 20), in particular for motor vehicles, at at least one of whose ends a plastics housing (14; 24) is arranged, said housing having mechanical dimensions in its interface region (30; 32) which conform to the FAKRA standardisation scheme. The data transmission cable (10; 20) has an optical waveguide, wherein a holding member (40) is provided in the plastics housing (14; 24), said holding member being configured for holding an optical imaging element (42) and for connecting the optical imaging element (42) to the optical waveguide.

9 Claims, 1 Drawing Sheet

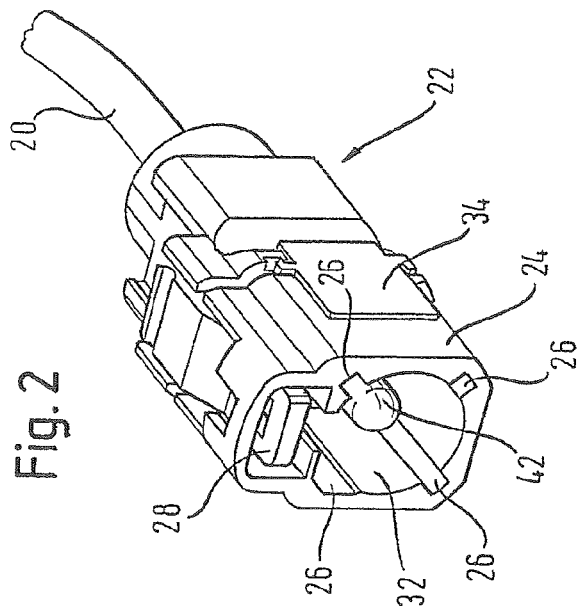
Fig. 1
Fig. 2
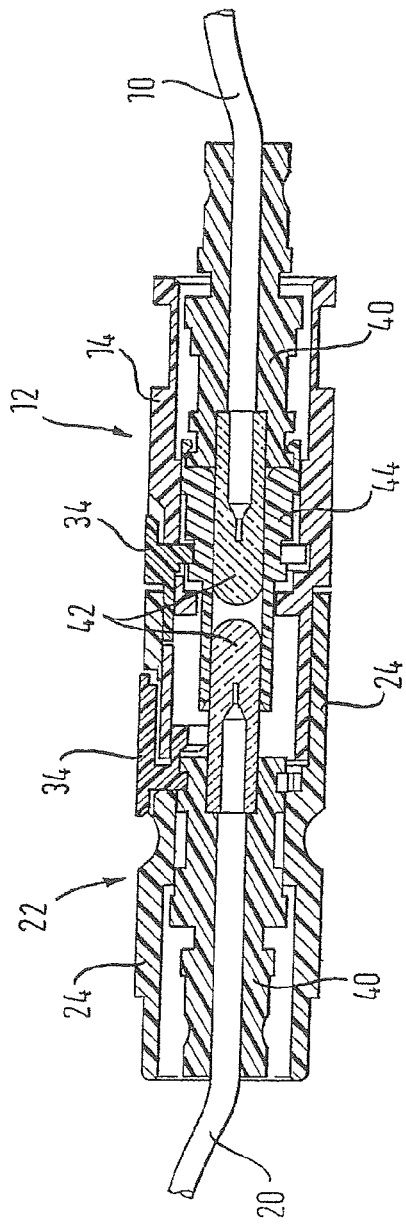
Fig. 3

DATA TRANSMISSION CABLE WITH FAKRA HOUSING

The present invention relates to a data transmission cable, in particular for motor vehicles, at least one of whose ends a plastics housing is arranged, said housing having mechanical dimensions in its interface region which conform to the FAKRA standardisation scheme, in particular for SMB connections, according to the preamble of claim 1.

US 2003/0176104 A1 discloses a coaxial connector which has a plastics housing which conforms to the FAKRA standardisation scheme (FAKRA=Fachkreis Automobiltechnik [Automotive Technical Group]) for SMB connections. A plastics housing is provided which holds and protects the connector, and pre-positions it for the connecting procedure with another connector having a plastics housing. The housing also has a mechanical coding so that only housings that are adapted to one another can be plugged together.

Plastics housings of this type for coaxial connectors, also known as FAKRA housings are used for data transmission cables in automotive technology. These data transmission cables are, for example, coaxial cables or similar cables based on an electrical conductor. The mechanical dimensions of FAKRA housings of this type in the interface region, i.e. in an axial section of the housing which cooperates with a complementary plug in order to create a mechanical connection between the two plastics housings, are laid down in the DIN standard 72594-1 in the version of October 2004. The part entitled "Road Vehicles—50 Ohm radio frequency interface (50 RFI)—Part 1: Dimensions and electrical requirements" of the above-mentioned DIN standard 72594-1 defines plugs and couplers of an interface with an impedance of 50Ω for radio frequency applications (50Ω-RFI) in road vehicles and thus ensures communication to and from the vehicle. It defines dimensional and electrical requirements and properties and ensures their interchangeability. All renowned automobile manufacturers use this standard in their production. The content of the standard is laid down by the motor vehicle standards committee (FAKRA).

The motor vehicle standards committee (FAKRA) within DIN represents regional, national and international interests with regard to standards for the automotive industry. The remit of FAKRA covers the drafting of all norms concerning compatibility, interchangeability and safety for road vehicles that accord with DIN 70010 (excluding agricultural tractors), independently of whether these road vehicles are equipped with internal combustion engines, electric motors or hybrid drives. FAKRA also defines norms for the bodywork of these road vehicles (excluding municipal vehicles, fire engines and ambulances). It is also responsible for standardisation of all the equipment for the aforementioned vehicles and bodies, as well as for the standardising of freight containers (ISO containers). Standardisation promotes rationalisation and quality assurance, as well as environmental tolerability, in vehicle manufacturing. It also contributes to the current state of the art in technology and science with regard to increasing vehicle and traffic safety, to the benefit of both manufacturers and users.

It is an object of the invention to improve a data transmission cable of the aforementioned type with regard to data transmission and simultaneously to reduce production costs.

This aim is achieved according to the invention with a data transmission cable of the aforementioned type having the features set out in claim 1. Advantageous embodiments of the invention are described in the other claims.

In a data transmission cable of the aforementioned type, it is provided according to the invention that it has an optical waveguide, wherein a holding member is provided in the plastics housing, said holding member being configured for holding an optical imaging element and for connecting the optical imaging element to the optical waveguide.

This has the advantage that a connector for optical waveguides that is economical to produce and can withstand the thermal and mechanical loads which typically arise in the field of motor vehicles is made available, for example, for the automobile industry. At the same time, data transmission with light waves enables the susceptibility to interference from external electromagnetic radiation to be substantially reduced (EMC), since the data are no longer transmitted by means of radio frequency electromagnetic waves conducted along wires, as in conventional data transmission cables, but rather by means of light, that is, electromagnetic waves in an entirely different frequency range.

Suitably, the optical imaging element is an optical lens.

Thereby that the holding member is arranged in the plastics housing in such a manner that the optical imaging element held thereon has, in the condition of the plastics housing plugged into a complementary plastics housing, a predetermined axial separation from the optical imaging element in the complementary plastics housing, mechanical tensions or forces during plugging together of two plastics housings are effectively avoided, as a result of which a good optical coupling is simultaneously ensured.

For optimal relative orientation of two optical imaging elements of two plastics housings plugged into one another, a coupling sleeve is also provided, said coupling sleeve being arranged and configured in such a manner that it axially guides two optical imaging elements of two plastics housings which are plugged into one another in a bore. For axial holding in the plastics housing, the coupling sleeve has means for cooperating with a primary safety device of the plastics housing.

For axial holding of the arrangement of optical waveguide, holding member and optical imaging element in the plastics housing, the holding member comprises means for cooperating with a primary safety device of the plastics housing.

In a preferred embodiment, the holding member and/or the optical imaging element is made from polycarbonate.

In a particularly preferred embodiment, the optical imaging element and the holding member are integrally constructed, in particular as an injection moulded part made from a single material.

The plastics housing is, for example, a plug or a coupling.

In a preferred embodiment, in its interface region, the plastics housing has mechanical dimensions which are selected in conformity with the DIN standard 72594-1:2004-10 "Road vehicles—50 Ohm radio frequency interface (50Ω-RFI)—Part 1: Dimensions and electrical requirements", Section "3. Dimensions and coding", FIGS. 1 to 3.

Preferably, in its interface region, the plastics housing has a mechanical coding with mechanical dimensions which are selected in conformity with the DIN standard 72594-1:2004-10 "Road vehicles—50 Ohm radio frequency interface (50Ω-RFI)—Part 1: Dimensions and electrical requirements", Section "3. Dimensions and coding", FIGS. 4 and 5.

The invention will now be described in greater detail with the aid of the drawings, in which:

FIG. 1 shows a preferred embodiment of a data transmission cable with a FAKRA housing in the form of a plug, in a perspective view, FIG. 2 shows an alternative preferred embodiment of a data transmission cable according to the invention with a FAKRA housing in the form of a coupling, in a perspective view, and FIG. 3 shows the plug of FIG. 1 and the coupling of FIG. 2 plugged together, in a sectional view.

The data transmission cable 10 shown in FIG. 1 is configured as an optical waveguide and has at one end a connector in the form of a plug 12 with a FAKRA plug housing 14. The FAKRA plug housing 14 is configured as a plastics housing and has radial elevations 16 and a detent hook 18 in its interface region 30. The radial elevations 16 are configured partially different with regard to their width in the peripheral direction and their height in the radial direction.

The data transmission cable 20 according to FIG. 2 is also configured as an optical waveguide and has a connector in the form of a coupler 22 with a FAKRA coupler housing 24 at one end. The FAKRA coupler housing 24 is configured as a plastics housing and has radial recesses 26 and a detent mechanism 28 in its interface region 32. The recesses 26 are arranged and configured in such a manner that, with regard to their width in the peripheral direction and their depth in the radial direction, they each match one of the radial elevations 16 of the FAKRA plug housing 14, so that only this FAKRA plug housing 14 is insertable, in only one particular position in the axial direction, into the FAKRA coupler housing 24. This represents a mechanical coding. In addition, the detent mechanism 28 is arranged and configured in such a manner that, in the predetermined insertion position, the detent hook 18 of the FAKRA plug housing 14 enters the region of the detent mechanism 28 of the FAKRA coupler housing 24, so that the detent mechanism 28 locks onto the detent hook 18 and provides mechanical locking which prevents axial separation of the plug 12 and the coupler 22.

The expression "interface region" here denotes an axial section of the FAKRA housing 14 or 24 which cooperates with the complementary FAKRA housing 24 or 14 in order to create a mechanical connection between plug and coupler. In a FAKRA plug housing 14, this interface region is configured as a cylindrical section 30 with outwardly situated radial elevations. In the FAKRA coupler housing 24, this interface region is configured with an axial bore 32 in which the radial recesses 26 are formed. The inner diameter of the axial bore 32 of the FAKRA coupler housing 24 and the outer diameter of the cylindrical section 30 of the FAKRA plug housing 14 are chosen such that the cylindrical section 30 of the FAKRA plug housing 14 fits and is insertable into the axial bore 32 of the FAKRA coupler housing 24.

According to the FAKRA standard (DIN 72594-1:2004-10) both the FAKRA plug housing 14 and the FAKRA coupling housing 24 are configured with a primary safety device 34 (FIG. 3). This primary safety device 34 serves to secure relevant components of the connector which are arranged within the housing 14 or 24 against movement in the axial direction relative to the housing and, where relevant, against rotation relative to the housing 14 or 24.

FIG. 3 shows the condition in which the plug 12 and the coupler 22 are plugged into one another. FIG. 3 also shows that each data transmission cable 10 and 20 is connected via a holding member 40 to an optical imaging element 42 in the form of a lens. The holding member 40 is configured in such a manner that it cooperates in the coupler 22 with the primary safety device 34, so that a locked in primary safety device 34 fixes the holding member 40 within the FAKRA coupler housing 24. The holding member 40 holds the respective lens 42 in a predetermined position within the FAKRA housing 14 or 24 and simultaneously creates an optical connection between the lens 42 and the respective optical waveguide 10 or 20.

Also provided in the FAKRA plug housing 14 is a coupling sleeve 44 which is fastened to a plug-side end of the holding member 40. The coupling sleeve 44 is configured in such a manner that it cooperates with the primary safety device 34 of the FAKRA plug housing 14, so that with the primary safety device of the FAKRA plug housing 14 locked in, the coupling sleeve 44, and together with it the holding member 40 fastened to the coupling sleeve 44, are fixed within the FAKRA plug housing 14. The coupling sleeve 44 has an axial through bore which is configured in such a manner that it accommodates the ends of the respective lenses 42 projecting beyond the holding member 40 and positions them as exactly as possible to each other in the axial direction, so that axial longitudinal axes of the lenses 42 align as far and as accurately with each other as possible. This creates a good optical coupling between the two lenses 42 of the plug 12 and the coupler 22 for transmission of the optical signal between the two lenses 42 that is as free of losses as possible.

As can be seen from FIG. 3, even with the plug 12 and coupler 22 fully plugged into one another, an axial gap remains between the two lenses 42. This has the advantage that, on plugging together the plug 12 and the coupler 22, no axial forces act on the optical imaging element 42 or the holding members 40 or the optical waveguides 10, 20. On the other hand, it is possible for the light transmitting the data or information within the optical waveguide to cross this gap without difficulty and without great losses. The optical imaging elements in the form of the lenses 42 concentrate the light coming from the optical waveguides 10 and 20 so that it can cross the gap better and with smaller losses.

The optical imaging element 42 is made, for example, from polycarbonate. It is also particularly preferred that the optical imaging element 42 and the holding element 40 are formed integrally with each other. For example, the optical imaging element 42 and the holding member 40 are made as an integral injection moulded part, in particular, from polycarbonate.

The interface region 30, 32 is configured, with regard to its mechanical dimensions, in conformity with the DIN standard 72594-1:2004-10 (in the version dated October 2004), "Road vehicles—50 Ω radio frequency interface (50Ω-RFI)—Part 1: Dimensions and electrical requirements", Section "3. Dimensions and coding", FIGS. 1 to 3. The mechanical dimensions of the mechanical coding conform, for example, to the details given in the aforementioned Part 1 of the DIN standard 72594-1:2004-10 in FIGS. 4 and 5, although they are not restricted thereto.

The invention claimed is:

1. A data transmission cable for motor vehicles comprising a plastic plug housing arranged on at least one end, said housing having mechanical dimensions in its interface region which conform to the FAKRA standardization scheme for 50Ω-RFI, said cable including:
   an optical waveguide;
   a holding member provided in the plastics housing, said holding member having a plug side end and configured for holding an optical imaging element in the form of a lens and for connecting said optical imaging element to the optical waveguide and being arranged in the plug housing such that in the inserted condition of the plug housing in a complementary coupler housing, the optical imaging element held thereon has a predetermined axial separation from the optical imaging element in the complementary coupler housing;
   a coupling sleeve fastened to said plug side end of said holding member when said plug housing is not engaged with said coupler housing, and having an axial bore for receiving and aligning said optical imaging element; and a releasable primary safety device in mechanical communication and cooperating with said coupling sleeve such that when said primary safety device is in a locked position, said coupling sleeve together with said holding member are releasably secured within said plug housing when said plug housing is not engaged with said coupler housing.

2. The data transmission cable of claim 1 wherein said coupling sleeve axially guides two optical imaging elements of two plastics housings into said axial bore.

3. The data transmission cable of claim 1 including having said primary safety device of the plastics housing cooperate with the coupling sleeve on said plug housing, said coupling sleeve affixed to said holding member.

4. The data transmission cable of claim 1 wherein the holding member or the optical imaging element is made from polycarbonate.

5. The data transmission cable of claim 1 including having the holding member and the optical imaging element integrally constructed.

6. The data transmission cable of claim 1 wherein in its interface region the plastics housing includes mechanical dimensions which are selected in conformity with DIN standard 72594-1:2004-10 "Road vehicles—50 Ohm radio frequency interface (50Ω-RFI)—Part 1: Dimensions and electrical requirements", Section "3. Dimensions and coding", FIGS. 1 to 3.

7. The data transmission cable of claim 1, wherein in its interface region the plastics housing includes a mechanical coding with mechanical dimensions which are selected in conformity with the DIN standard 72594-1:2004-10 "Road vehicles—50Ohm radio frequency interface (50Ω-RFI)—Part 1: Dimensions and electrical requirements", Section "3. Dimensions and coding", FIGS. 4 and 5.

8. The data transmission cable of claim 5 including having the holding member and the optical imaging element integrally constructed as an injection-molded part made from a single material.

9. A data transmission cable for motor vehicles comprising a coupler housing arranged on at least one end, adapted to connect with a complementary plug housing, said coupler housing having mechanical dimensions in its interface region which conform to the FAKRA standardization scheme for 50Ω-RFI, said cable including:
   an optical waveguide;
   a holding member provided with the coupler housing, said holding member having a coupler side end and configured for holding an optical imaging element in the form of a lens and for connecting said optical imaging element to the optical waveguide and being arranged in the coupler housing such that in the inserted condition of the coupler housing in a complementary plug housing, the optical imaging element held thereon has a predetermined axial separation from the optical imaging element in the complementary housing; and
   a releasable primary safety device in mechanical communication and cooperating with said holding member such that when said primary safety device is in a locked position, said holding member is releasably secured within said coupler housing when said coupler housing is not engaged with said plug housing.

* * * * *